(12) United States Patent
Hoenich et al.

(10) Patent No.: US 11,341,384 B2
(45) Date of Patent: May 24, 2022

(54) DOCUMENT PROCESSING SYSTEM AND METHOD FOR ASSOCIATING METADATA WITH A PHYSICAL DOCUMENT WHILE MAINTAINING THE INTEGRITY OF ITS CONTENT

(71) Applicant: BancTec, Incorporated, Irving, TX (US)

(72) Inventors: Dennis A. Hoenich, Bedford, TX (US); David W. Hunt, Cedar Hill, TX (US); Walter K. Logan, Lewisville, TX (US); James H. Wicker, Fort Worth, TX (US); John P. Fiala, Hickory Creek, TX (US)

(73) Assignee: BancTec, Incorporated, Irving, TX (US)

( * ) Notice: Subject to any disclaimer, the term of this patent is extended or adjusted under 35 U.S.C. 154(b) by 616 days.

(21) Appl. No.: 14/471,881

(22) Filed: Aug. 28, 2014

(65) Prior Publication Data

US 2016/0063365 A1    Mar. 3, 2016

(51) Int. Cl.
*G06F 16/908* (2019.01)
*G06K 15/02* (2006.01)
(Continued)

(52) U.S. Cl.
CPC ......... *G06K 15/1892* (2013.01); *G06K 1/121* (2013.01); *G06K 15/102* (2013.01);
(Continued)

(58) Field of Classification Search
CPC .... G06F 17/30876; G06F 17/30; G06F 21/41; H04N 2201/3269; H04N 1/00358; H04N 1/00376; H04N 1/00968; H04N 1/32101; H04N 1/32144; H04N 1/32288; H04N 1/0087; H04N 1/32304; H04N 2201/327; B42D 2035/34; B42D 25/00; G07D 7/0043; G07D 7/0053; G07D 7/005; G07D 7/04; G06K 19/06028; G06K 7/10861;
(Continued)

(56) References Cited

U.S. PATENT DOCUMENTS 4,268,617 A * 5/1981 Mitsui ................. C07F 15/065
                                                    430/367
5,126,544 A * 6/1992 Izumi ................. G06K 7/0166
                                                    235/454
(Continued)

OTHER PUBLICATIONS

Exciton, "HITC", Dayton, OH, www.exciton.com, 2 pages.

*Primary Examiner* — Alex Gofman
*Assistant Examiner* — Linh Black
(74) *Attorney, Agent, or Firm* — Seyfarth Shaw LLP; Puya Partow-Navid

(57) ABSTRACT

For use with a physical document bearing content visible when illuminated by light in the human visible spectrum, a tag printer, a verifier and a document processing system employing one or both of the printer and the verifier. In one embodiment, the tag printer includes: (1) a processor operable to generate metadata regarding the physical document and (2) a printer associated with the processor and operable to print a tag containing the metadata on a location of the physical document irrespective of locations of the content using an ink substantially invisible in the spectrum.

26 Claims, 3 Drawing Sheets

(51) Int. Cl.
| | |
|---|---|
| *G06K 15/10* | (2006.01) |
| *H04N 1/00* | (2006.01) |
| *H04N 1/44* | (2006.01) |
| *H04N 1/32* | (2006.01) |
| *G06K 17/00* | (2006.01) |
| *G06K 19/06* | (2006.01) |
| *G06K 1/12* | (2006.01) |

(52) U.S. Cl.
CPC ......... *G06K 15/1889* (2013.01); *G06K 17/00* (2013.01); *G06K 19/0614* (2013.01); *H04N 1/00334* (2013.01); *H04N 1/00803* (2013.01); *H04N 1/3232* (2013.01); *H04N 1/4493* (2013.01); *H04N 2201/0081* (2013.01); *H04N 2201/0082* (2013.01); *H04N 2201/327* (2013.01); *H04N 2201/3228* (2013.01)

(58) Field of Classification Search
CPC ........... G06K 19/06112; G06K 7/1413; G06K 7/1417; G06K 7/1443; G06Q 20/3274; G07G 1/0045
USPC ................ 707/707, 711, 715, 741, 830, 752, 707/E17.095, E17.096, E17.102, E17.113
See application file for complete search history.

(56) References Cited

U.S. PATENT DOCUMENTS

| | | | | | |
|---|---|---|---|---|---|
| 5,159,340 | A * | 10/1992 | Smith | .................... | H03K 5/084 235/462.27 |
| 6,193,158 | B1 * | 2/2001 | Hecht | .................... | G06K 7/14 235/462.16 |
| 6,227,531 | B1 * | 5/2001 | Guerrero | ................ | B65H 33/04 270/1.01 |
| 9,378,205 | B1 * | 6/2016 | Schmidt | ............ | G06F 17/30587 |
| 2001/0006191 | A1 * | 7/2001 | Hecht | ................... | G06K 7/1456 235/462.16 |
| 2002/0056669 | A1 * | 5/2002 | Pratt | ....................... | B07C 5/365 209/540 |
| 2002/0059045 | A1 * | 5/2002 | Tackett | ................ | G06N 3/006 702/182 |
| 2002/0107302 | A1 * | 8/2002 | Escano | ............... | C09D 11/101 523/160 |
| 2002/0122568 | A1 * | 9/2002 | Zhao | ...................... | G06F 21/10 382/100 |
| 2002/0184220 | A1 * | 12/2002 | Teraguchi | .............. | G11B 27/28 |
| 2002/0190129 | A1 * | 12/2002 | Urano | ...................... | G06K 7/14 235/462.27 |
| 2003/0013149 | A1 * | 1/2003 | Wachter | ........... | C07K 14/43595 435/69.1 |
| 2003/0062422 | A1 * | 4/2003 | Fateley | .................. | G06K 19/06 235/494 |
| 2003/0152277 | A1 * | 8/2003 | Hall, Jr. | ............ | G06K 9/00463 382/229 |
| 2004/0086182 | A1 * | 5/2004 | Bian | ....................... | G06K 7/14 382/183 |
| 2004/0233465 | A1 * | 11/2004 | Coyle | .................... | B41M 3/008 358/1.9 |
| 2006/0071078 | A1 * | 4/2006 | Olmstead | ............. | G06K 7/1452 235/462.01 |
| 2006/0071085 | A1 * | 4/2006 | Philyaw | ............... | H04N 21/4622 235/494 |
| 2006/0193005 | A1 * | 8/2006 | Kato | .................. | H04N 1/32363 358/1.15 |
| 2007/0016790 | A1 * | 1/2007 | Brundage | ............. | G06T 1/0071 713/176 |
| 2007/0177824 | A1 * | 8/2007 | Cattrone | ................. | G06F 16/93 382/306 |
| 2007/0295812 | A1 * | 12/2007 | Mazowiesky | .......... | G07D 7/121 235/454 |
| 2008/0005091 | A1 * | 1/2008 | Lawler | .................. | G06F 16/951 |
| 2008/0020938 | A1 * | 1/2008 | Kaplan | .................... | C40B 60/12 506/7 |
| 2008/0180707 | A1 * | 7/2008 | Kanematsu | ............... | G06T 7/00 358/1.9 |
| 2010/0155463 | A1 * | 6/2010 | Roquemore, III | ..... | G07D 7/002 235/375 |
| 2010/0270376 | A1 * | 10/2010 | McQueen | .......... | G06K 7/10722 235/462.11 |
| 2010/0328726 | A1 * | 12/2010 | Babbrah | ............ | H04N 1/32128 358/1.18 |
| 2012/0018516 | A1 * | 1/2012 | Gao | .................. | G06K 7/1417 235/454 |
| 2012/0055991 | A1 * | 3/2012 | Nakamura | ........... | G06K 7/1439 235/437 |
| 2012/0067944 | A1 * | 3/2012 | Ross | ..................... | G06K 7/1095 235/375 |
| 2012/0070833 | A1 * | 3/2012 | Wang | ................. | B01L 3/502776 435/6.11 |
| 2013/0290326 | A1 * | 10/2013 | Lebedev | ........... | G06F 17/30879 707/736 |
| 2013/0299587 | A1 * | 11/2013 | Tiao | ................. | G06K 19/06084 235/470 |
| 2014/0201172 | A1 * | 7/2014 | Reed | ....................... | G06F 19/22 707/692 |
| 2014/0267754 | A1 * | 9/2014 | Rantala | .................. | B42D 25/29 348/162 |
| 2014/0312125 | A1 * | 10/2014 | Noumura | .......... | G06K 19/06028 235/494 |
| 2015/0012339 | A1 * | 1/2015 | Onischuk | ................ | G07C 13/00 705/12 |
| 2015/0072762 | A1 * | 3/2015 | Curtin | .................. | G07F 17/3225 463/25 |

* cited by examiner

DOCUMENT PROCESSING SYSTEM AND METHOD FOR ASSOCIATING METADATA WITH A PHYSICAL DOCUMENT WHILE MAINTAINING THE INTEGRITY OF ITS CONTENT

TECHNICAL FIELD

The invention generally relates to document processing systems, and more specifically document processing systems designed to print metadata on physical documents and subsequently read and validate the metadata during processing of the physical documents.

BACKGROUND

Index tags, each incorporating an index number, are routinely printed on physical documents during automated document processing. The metadata allows the documents to be tracked and indexed, which is useful if images of the document are captured or the document is included in an indexed archive. The printing of index tags conventionally employs inks that are visible in the human visible spectrum, defined herein as being from about 390 to about 700 nanometers (nm) in wavelength. These inks are also visible to conventional image cameras, so captured images also contain the printed index tags.

Some processing applications desire to capture images that do not contain all of the visible markings, and in these applications the conventional technique is to use "drop-out inks," or "color drop-out techniques," in which visible marks, including index tags, are removed from the captured image. For example, one such device is shown in U.S. Pat. No. 5,335,292 to Lovelady. U.S. Pat. No. 5,773,818 to Herloski, takes an alternative approach, employing optical filters to remove or allow a predetermined range of wavelengths.

SUMMARY

One aspect provides, for use with a physical document bearing content visible in the visible spectrum, a tag printer. In one embodiment, the tag printer includes: (1) a processor operable to generate metadata regarding the physical document and (2) a printer associated with the processor and operable to print a tag containing the metadata on a location of the physical document irrespective of locations of the content using an ink substantially invisible in the spectrum.

Another aspect provides a verifier. In one embodiment, the verifier includes: (1) a reader, having: (1a) a light source operable to project light upon the physical document at an angle that is acute relative to the physical document and (1b) a scanner operable to read metadata regarding the physical document and printed on the physical document with an ink substantially invisible in the spectrum and (2) a processor associated with the camera and operable to compare the metadata with an image file containing an image of the physical document.

Yet another aspect provides a document processing system. In one embodiment, the document processing system includes: (1) a reader operable to read the metadata using light outside of the spectrum emitted from the ink and (2) a processor coupled to the reader and configured to route the physical document in the document processing system based on a comparison between the metadata and an index number associated with an image file.

Still another aspect provides a method of processing the physical document. In one embodiment, the method includes: (1) reading the metadata using light outside of the spectrum emitted from the ink and (2) routing the physical document in the document processing system based on a comparison between the metadata and an index number associated with an image file.

BRIEF DESCRIPTION

Reference is now made to the following descriptions taken in conjunction with the accompanying drawings, in which.

DETAILED DESCRIPTION

It is realized herein that the printing of visible tags on physical documents can corrupt their content were they to overlap it. It is further realized herein that many conventional physical document types lack well-defined or adequate "clear" areas in which visible tags or other information may be printed without interfering with the content.

It is realized herein that invisible tags, namely those printed such that they are substantially invisible in the human visible spectrum defined above, may be employed instead of visible tags. Though they bear invisible tags, the physical documents appear normal and thus retain their integrity when viewed by a human being under normal, room-lighting conditions. However, the invisible tags are visible and readable outside the human visible spectrum, e.g., in the ultraviolet (UV) or infrared (IR) spectrum. It is further realized that the novel invisible tags may overlap content without reducing its integrity. Thus, clear areas become unnecessary.

Figure 1:
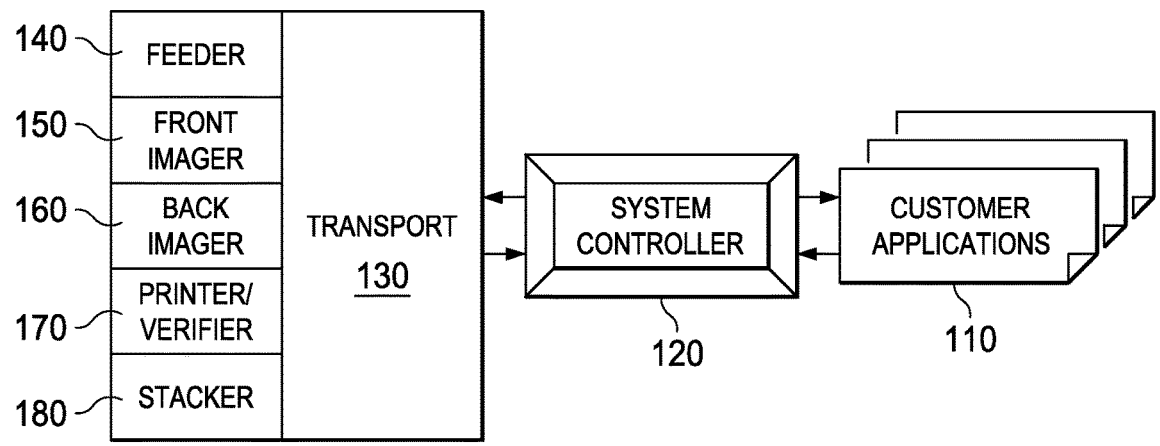
FIG. 1 is a diagram schematically illustrating one embodiment of a document processing system for processing physical documents such as customer applications.

FIG. 1 is a diagram schematically illustrating one embodiment of a document processing system for processing physical documents such as physical customer applications 110. In FIG. 1, the physical customer applications are transported among various modules with which they are read, tagged, verified and stacked. More specifically, in the embodiment of FIG. 1, a system controller 120 controls a transport mechanism 130 to convey the physical customer applications into a feeder 140. From the feeder 140, the transport mechanism 130 transports the physical customer applications 110 to a front imager 150, which images the fronts of the pages of the physical customer applications 110 to create corresponding electronic images including the content on the fronts of the pages. From the front imager 150, the transport mechanism 130 transports the physical customer applications 110 to a back imager 160, which images the backs of the pages of the physical customer applications 110 to create corresponding electronic images including the content on the backs of the pages. The front and back electronic images may then be stored in one or more image files, which may be analyzed, transformed or archived as a particular application desires.

From the back imager 160, the transport mechanism 130 transports the physical customer applications 110 to a printer/verifier 170. In the illustrated embodiment, the printer/verifier 170 is operable to print one or more tags on the fronts or backs of the physical customer applications 110, the tags containing metadata regarding the physical customer applications, such as an index number, other unique identifier or characteristic, such as a keyword. In the illustrated embodiment, the printer/verifier 170 is further operable to read the physical customer applications 110 and any tags printed thereon and verify that the tags have been correctly printed and printed on the correct physical customer applications 110 to which they correspond. From the printer/verifier 170, the transport mechanism 130 transports the physical customer applications 110 to a stacker 180, which places the physical customer applications 110 in different stacks, perhaps depending upon the metadata. In one embodiment, the stacker 180 places the physical customer applications 110 bearing erroneous or poorly printed tags in a separate stack, perhaps for subsequent reprocessing, special processing or manual processing.

In an alternative embodiment, the functions of the printer/verifier are separated such that a printer first prints tags on one or both of the front and back of the physical customer applications 110. Then, a separate reader/verifier is operable to read and verify the tags by comparing the metadata they contain with metadata associated with images corresponding to the physical customer applications 110.

Figure 2:
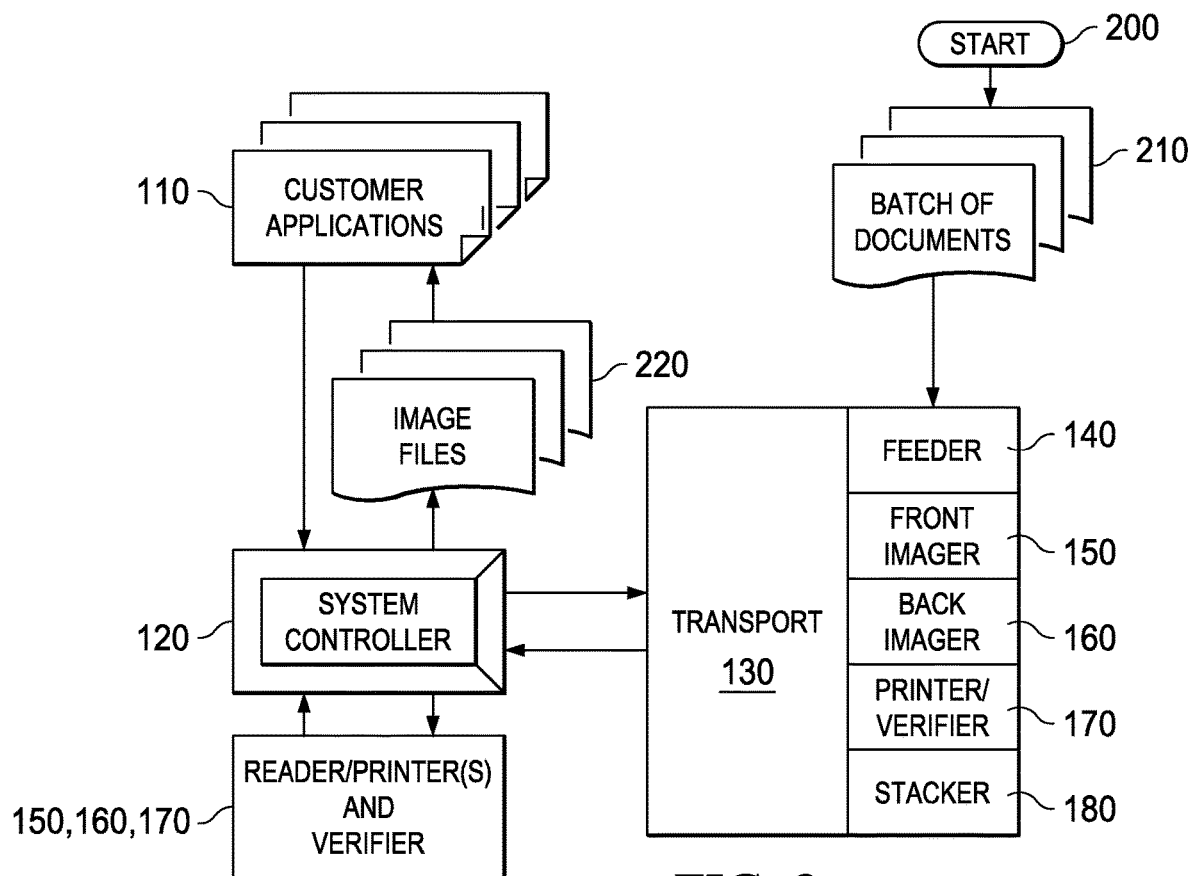
FIG. 2 is a diagram schematically illustrating a more specific embodiment of a document processing system for processing physical documents such as customer applications.

FIG. 2 is a diagram schematically illustrating a more specific embodiment of a document processing system for processing physical documents such as physical customer applications. FIG. 2 shows the physical customer applications 110, the system controller 120, the transport mechanism 130, the feeder 140, the front imager 150, the back imager 160, the printer/verifier 170 and the stacker 180 of FIG. 1.

At a start block 200, a batch of physical documents 210 is presented to the document processing system. In the illustrated embodiment, the physical documents are a mixture of different documents comprised of various shapes and/or thicknesses. In an alternative embodiment, the physical documents are similar, i.e., of the same type or having the same physical characteristics of shape or thickness. The batch of physical documents 210 may be, for example, negotiable instruments such as checks, deposit slips, coupons, lottery tickets, or currency, medical forms for claims or insurance information, credit applications for mortgages or lines of credit, architectural drawings, mechanical drawings, envelopes, lunch vouchers, airline tickets, sport event tickets, X-ray films or the like. The batch of physical documents 210 is presented to the feeder 140 as described in FIG. 130, which, under control of the system controller 120 and the transport mechanism 130, are then transported through the front imager 150, the back imager 160, the printer/verifier 170 and the stacker 180. As FIG. 2 indicates, the system controller 120 is directly coupled to the reader/printer(s) and verifier 150, 160, 170 to allow metadata and images to be transferred thereamong. Ultimately, documents are sorted, stacked and associated with corresponding image files 220. Often the original batch of physical documents 210 (e.g., the customer applications 110) are archived or destroyed, and the corresponding image files 220 are retained for further, typically purely electronic, processing.

As stated above, the batch of physical documents 210 may be composed of a mixture of documents. The documents typically contain preprinted text that is absorbing in the IR spectrum. An example of an ink that is absorbing in the IR region is any ink containing a carbon black pigment. The documents may also contain "carbonless coatings," also known as "carbonless forms," and the chemical compounds used in carbonless forms also fluoresce (emit light when excited by electromagnetic radiation such as light) in the near IR spectrum. Such forms are often used in the medical and financial industry, so that copies of the same form can be provided to multiple sources. Another example for the use of carbonless forms is in the transportation industry, where the original copy stays with the party shipping the product, and the carbonless copies are used by the shipper as both a billing method and an address label.

During the automated processing of financial forms, it is important not to alter any of the existing text with the printing of tags or other information. For example, for check processing, all tags, or other information such as endorsements, must be printed on the back of the physical document. This is so that the amount of the check that has been pre-printed on the front of the check is not altered by printing methods during automated processing.

Similar to check processing, certain types of other financial documents cannot be altered by printing methods during automated processing of the documents. Examples are legal contracts, medical forms, transportation forms, and the like. The document, and any original copy such as carbonless forms, are legal binding contracts between various parties. As such, alteration of the document is not acceptable.

Forms may, whenever possible, be provided with a clear area for the printing of tags or other information that may be required during automated document processing. Such clear areas provided space for printing during document processing without affecting the pre-printed text of the document. The clear area also enabled the use of machine readable printed text, such as Optical Character Recognition fonts OCRA and OCRB, as well as barcodes. The clear area also enabled the use of specialized inks that fluoresce in the visible or invisible spectrums. However, different forms cannot be mixed, because the locations of the clear areas are not standardized. Because forms cannot be mixed, and machine readable fonts such as OCRA, OCRB, and barcodes cannot be read when printed over existing content, conventional automated processing techniques have been limited.

As previously stated, many forms contain inks that are either absorbing or fluorescent in the near-IR spectrum. All carbon-based inks are absorbing in the near-IR region, and the majority of carbonless forms contain chemicals that are highly fluorescent in the near-IR region. Because of the absorbing and fluorescing nature of such inks, the use of IR fluorescing inks has not been seen as a viable option for the printing of tags or other data. Introduced herein are various embodiments of a document processing system employing inks that are invisible (do not substantially fluoresce in the human visible spectrum when illuminated with natural light) but substantially fluoresce outside the visible spectrum when illuminated. Further introduced herein are various embodiments of a document processing system employing a tagging scheme that allows invisible tags to be read reliably even in the presence of interference arising from fluorescence by inks bearing document content.

Figure 3:
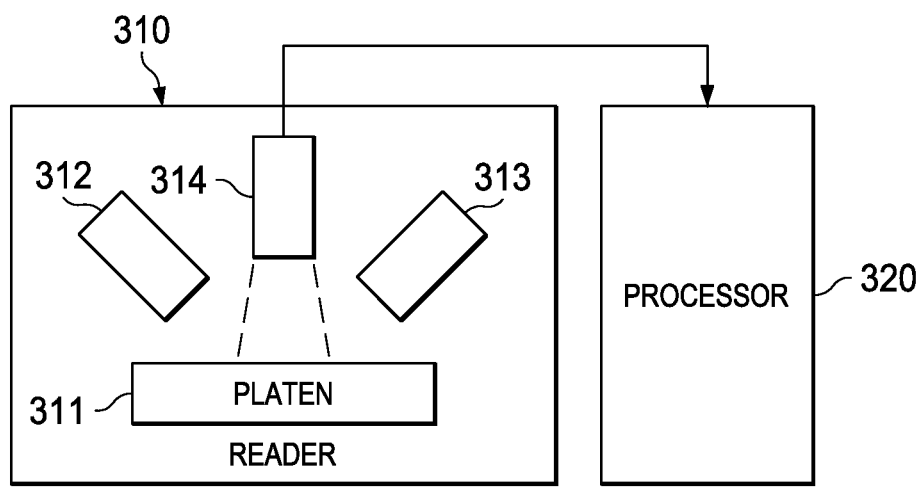
FIG. 3 is a schematic diagram of one embodiment of a document processing system.

FIG. 3 is a schematic diagram of one embodiment of such a document processing system. The document processing system includes a reader 310. The reader 310 includes a light source operable to illuminate the physical document with light. In various alternative embodiments, the light is inside the visible spectrum, outside the visible spectrum, or both inside and outside the visible spectrum. The reader 310 further includes a scanner that is operable to read metadata regarding the physical document and printed on the physical document with an ink that is substantially invisible in the human visible spectrum.

In one embodiment, the reader 310 includes at least one light source operable to project light upon the physical document at an angle that is acute relative to the physical document. In the embodiment of FIG. 3, a substantially planar platen 311 supports the document. First and second light sources 312, 313 are operable to project light upon the physical document on the platen 311. In the embodiment of FIG. 3, the first and second light sources 312, 313 project the light upon the document at approximately 45° angles relative thereto as shown. In alternative embodiments, the first and second light sources 312, 313 project the light at angles ranging between about 20° and about 80°.

The reader also includes a scanner 314. The scanner 314 is operable to read metadata regarding the physical document and printed on the physical document with an ink substantially invisible in the visible spectrum.

In the illustrated embodiment, the scanner 314 includes a photomultiplier (PM), which typically takes the form of a PM tube. In one specific embodiment, the light illuminating the physical document includes light within the human visible spectrum, such as may be produced by red LEDs. In the illustrated embodiment, an analog-to-digital converter is employed to convert the output of the PM to digital form. If the tag takes the form of a barcode, the analog-to-digital converter may, for example, convert bar absences to logical zeroes and bar presences to logical ones, resulting in metadata that takes the form of a number containing binary digits.

In another embodiment, the scanner 314 is a camera, which may capture an image of a portion of the physical document including the metadata. In a more specific embodiment, the image may further include the content printed in visible ink on the physical document. In such embodiment, the light illuminating the physical document would typically include light both within and outside of the visible spectrum, though this is not required. In this embodiment, one or both of the imagers 160, 170 of FIGS. 1 and 2 may be integrated with the printer/verifier 170 of FIGS. 1 and 2, allowing physical documents to be imaged and tags to be printed and verified in one physical unit.

The document processing system of FIG. 3 also includes a processor 320. In the embodiment of FIG. 3, the processor 320 is coupled to the reader 310 and is operable to route the physical document in the document processing system based on a comparison between the metadata and an index number associated with an image file. In one embodiment, the processor 320 is operable to route the physical document to one stack if the metadata favorably compares to (e.g., matches) the index number. In a related embodiment, the processor 320 is operable to route the physical document to one stack if the metadata does not favorably compare to (e.g., does not match) the index number.

Figure 4:
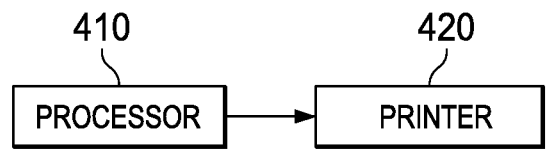
FIG. 4 is a schematic diagram of one embodiment of a tag printer of the document processing system of FIG. 3.
Figure 5:
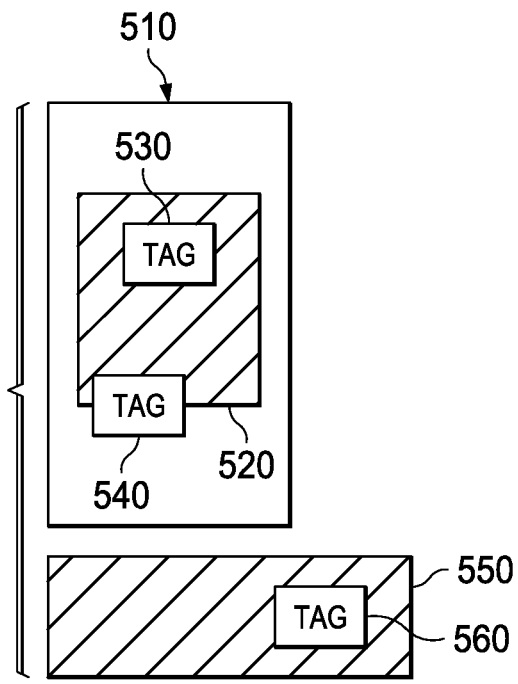
FIG. 5 is a diagram of batch of physical documents composed of a mixture of documents.

FIG. 4 is a schematic diagram of one embodiment of a tag printer of the document processing system of FIG. 3. The tag printer embodiment of FIG. 4 includes a processor 410. The processor 410 is operable to generate metadata regarding a physical document, such as an index tag or other information characterizing the physical document (e.g., document type, size, page count or other attributes that may be of use). The tag printer embodiment of FIG. 4 further includes a printer 420 associated with the processor 410. The printer 420 is operable to print a tag containing the metadata on a location of the physical document irrespective of locations of the content using an ink substantially invisible in the human visible spectrum. FIG. 5 illustrates this point.

FIG. 5 is a diagram of batch of physical documents composed of a mixture of documents. A first document 510 is a conventional, portrait-oriented document having an area of content 520 located within an unreferenced margin. The first document 510 may be, for example, a page of a letter or a contract. A tag 530 may be printed wholly within the area of content 520. Alternatively, a tag 540 may be printed partially within the area of content 520 and within the unreferenced margin. A second document 550 is a conventional, landscape-oriented document having an area of content that spans the entire area of the document. The second document 550 may be, for example, a check or a deposit slip. A tag 560 may be printed wholly within the area of content. Any tag may be printed anywhere on each of the first and second documents 510, 550 without regard to the location of content.

Figure 6:
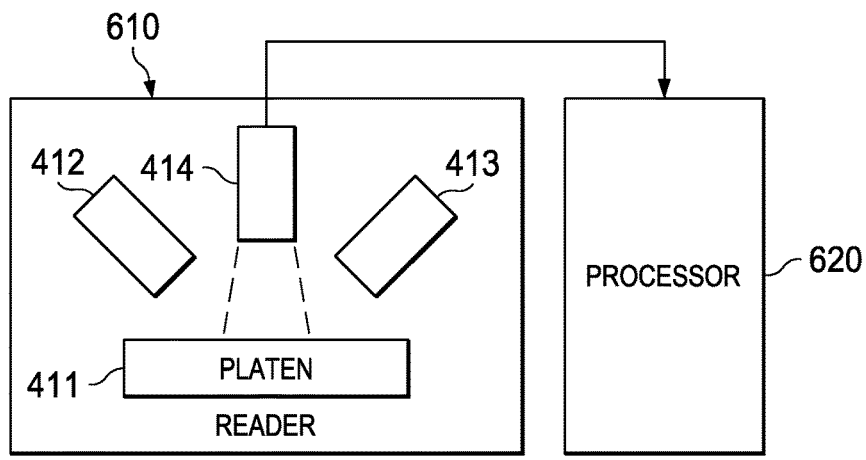
FIG. 6 is a schematic diagram of one embodiment of a verifier of the document processing system of FIG. 3.

FIG. 6 is a schematic diagram of one embodiment of a verifier of the document processing system of FIG. 3. The verifier includes a reader 610, which in the illustrated embodiment is the same as the reader of FIG. 4. Accordingly, various embodiments of its constituent parts will not be described again. The reader 610 is coupled to a processor 620. In the embodiment of FIG. 6, the processor 620 is operable to compare the metadata with an image file containing an image of the physical document. In one embodiment, the processor 620 is further operable to provide an indication of a mismatch between the metadata and the image file to an operator, perhaps by means of a warning light or icon.

In one embodiment, the light source includes at least one red LED, and the verifier further includes a camera operable to produce the image contained in the image file. The red LED is operable to project light both within and outside of the human visible spectrum upon the physical document. The camera is operable to employ at least the light that is outside of the human visible spectrum to form the image. For example, a font such as MICR E13B may be read with both a magnetic reader and an optical reader. As those skilled in the pertinent art understand, MICR E13B is a Magnetic Ink Character Recognition font developed for checks and deposit slips and which has been printed on them for decades. MICR E13B characters may be recognized in the image and compared with the metadata to determine whether or not a match exists. The physical document may then be routed based upon whether or not the match exists.

In an alternative embodiment, a light source other than a red LED is used, namely a blue LED. For example, a blue LED may be used to excite an IR fluorescent compound in an ink indirectly using a second fluorescent compound in the same ink. The blue LED excites the second fluorescent compound, and IR light emitted by the second fluorescent compound then excites the IR fluorescent compound.

Figure 7:
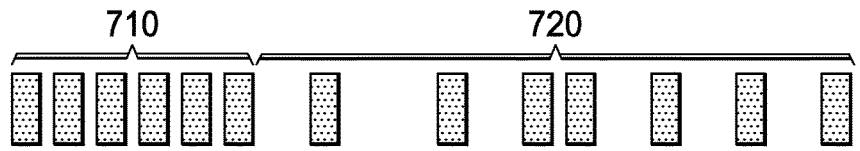
FIG. 7 is an example of an index number printable by the tag printer of FIG. 4 and verifiable by the verifier of FIG. 6.

FIG. 7 is an example of an index number printable by the tag printer of FIG. 4 and verifiable by the verifier of FIG. 3. In the embodiment of FIG. 7, the tag is a barcode having a start bar field 710 and a tag field 720.

The bars in the start bar field and the tag field 720 are printed with an ink that is not visible in the visible spectrum. Furthermore, the ink produces fluorescent light in the near IR region, which is defined by the International Commission on Illumination as being in the wavelength band of 700 to 1400 nm.

Tests were carried out using a combination of common barcodes, including one- and two-dimensional barcodes. When the barcodes are printed over existing text, the use of visible ink obscures and alters the text. As described above, this is not an acceptable option for printing tags or any other type of data.

Similar tests were carried out using an ink that is invisible to the human eye, but contains a chemical compound that is fluorescent in the near-IR region. When this ink was printed over carbon-based inks and over carbonless forms, the visible text is not altered. However, the absorbing nature of carbon-based inks in the IR region make it difficult to obtain satisfactory read rates of common barcodes. Also, when printed over carbonless forms, the fluorescing nature of the chemicals in carbonless forms cause not only very poor read rates, but also cause substitution misreads of the common barcodes. Both types of read errors are not acceptable for automated document processing techniques. In the case of a substitution the error will result in the assignment of the wrong tag to an image file.

The barcode of FIG. 7 was developed to overcome the issue of excessive read errors. By using bars of the same width, with spacing proportional to the bar width, satisfactory reading was performed.

Tests were carried out using a barcode as seen in FIG. 7. During testing it was determined that the start bar field 710 provided a reliable means of overcoming the issues of the IR absorbing and fluorescing backgrounds found on many types of forms. The start bar field 710 provides a uniform signal in both time and luminance output, which is advantageous. With the incorporation of correction algorithms within the tag field 720, further improvement in read rates were obtained.

Like the barcode, the ink was developed for the document processing system introduced herein. In one embodiment, the dye for the ink is 1,1',3,3,3',3'-Hexamethylindotricarbocyanine Iodide, commercially available from Sigma-Aldrich Corporation of St. Louis, Mo. IR fluorescent dyes are used in various applications, primarily in the medical field, such as for staining tissue samples or for DNA sequencing and for making lasers. They are not intended for use in inks.

Most of the IR dyes have similar chemistry, in that the organic structure of the molecule is that of a complex organic salt surrounding a polyatomic ion. In the case of 1,1',3,3,3',3'-Hexamethylindotricarbocyanine Iodide, the polyatomic ion is Iodide. The ion plays a significant role in both physical color and the wavelength. However, because the molecule contains a polyatomic ion, the molecule is fragile. Care should be taken to prevent substitution or loss of the ion.

Example 1

A mixture of 70% water, 5% anhydrous ammonia, 5% SST-fluorescent dye (commercially available from Day-Glo Color Corporation), 10% polyethylene glycol (commercially available from BASF), and 10% ethylene glycol monobutyl ether (commercially available from the Dow Chemical Company) were compounded into a homogeneous solution. The resulting mixture was then introduced into a thermal ink jet printer and small droplets of the mixture were ejected onto paper in a barcode pattern to produce a print sample. The resulting print sample was then excited with a blue light-emitting diode (LED) light source to produce a fluorescent signal which was detected with a photomultiplier tube.

Example 2

A mixture of 50% methanol, 39% water, 5% polyethylene glycol (commercially available from BASF), 5% ethylene glycol monobutyl ether (commercially available from Dow Chemical), and 1,1',3,3,3',3'-Hexamethylindodicarbocyanine Iodide (commercially available from Sigma Aldrich) were compounded into a homogeneous solution. The resulting mixture was then introduced into a thermal ink jet printer and small droplets of the mixture were ejected onto paper in a barcode pattern to produce a print sample. The resulting print sample was then excited with a red LED light source to produce a fluorescent signal which was detected with a photomultiplier tube.

Example 3

A mixture of 50% N-propanol, 39% water, 5% polyethylene glycol (commercially available from BASF), 5% ethylene glycol monobutyl ether (commercially available from the Dow Chemical Company), and 1% 1,1'-Diethyl-2,2'-dicarbocyanine Iodide (commercially available from Sigma Aldrich) were compounded into a homogeneous solution. The resulting mixture was then introduced into a thermal ink jet printer and small droplets of the mixture were ejected onto paper in a barcode pattern to produce a print sample. The resulting print sample was then excited with a red LED light source to produce a fluorescent signal which was detected with a photomultiplier tube.

Test Results

Example 1 resulted in a bright orange solution. When printed onto paper, the resulting print was also bright orange and visible to the human. Excitation was via a standard blue-light UV tube. The resulting emission of light was also in the UV region and appeared bright orange. When printed over existing text the signal is weak, and also has enough opacity to cover up the existing text, making it difficult to read or image the original text.

Example 2 resulted in a bluish green solution. When printed onto paper, the resulting print was invisible to the human eye. Excitation was via a red LED. The resulting emission of light was in the IR region, so also invisible to the human eye. When printed over existing text it did not alter the text, and the signal was still strong.

Example 3 resulted in a bluish green solution. When printed onto paper, the resulting print was invisible to the human eye. Excitation was via a red LED. The resulting emission of light was in the IR region, so also invisible to the human eye. When printed over existing text it did not alter the text, and the signal was still strong.

Each of the examples can be modified with minor changes to the solvent system to obtain optimal printing characteristics for different types of ink jet printers.

Laser Dyes

The active IR fluorescent compound in formulas 2 and 3 are part of the coumarin family of organic compounds. They are part of a group of synthetic compounds known as laser dyes. Primary applications of laser dyes are for producing tunable lasers and pumped lasers. They are also used for staining biological samples.

A number of the coumarins contain a salt, or polyatomic ion, within the organic structure. Caution must be exercised in the selection and purity of each material used to produce a finished ink. If the raw materials contain free ions, substitution of the ion is highly likely, resulting in unfavorable changes to the color of the ink, including changes to the absorption and emission wavelengths of the compound.

Figure 8:
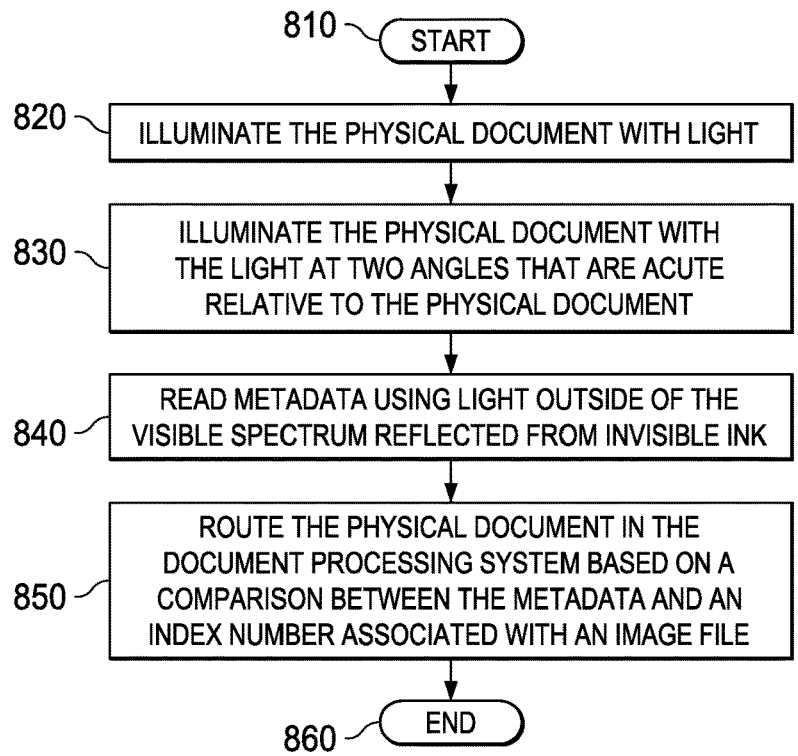
FIG. 8 is a flow diagram of one embodiment of a method of processing physical documents.

FIG. 8 is a flow diagram of one embodiment of a method of processing physical documents. The method begins in a start step 810. In a step 820, the physical document is illuminated with light, which may be inside or outside of the visible spectrum or both inside and outside of the visible spectrum. In one embodiment, in a step 830, the physical document is illuminated with the light at two angles that are acute relative to the physical document. In a step 840, the metadata is read. In one embodiment, the metadata is read using a PM tube. In another embodiment, an image is formed that includes at least the metadata and perhaps also the content. In a step 850, the physical document is routed in the document processing system based on a comparison between the metadata and an index number associated with an image file. In an alternative embodiment, the metadata is compared to the image and some action is taken based on the comparison. The method ends in an end step 860.

Those skilled in the art to which this application relates will appreciate that other and further additions, deletions, substitutions and modifications may be made to the described embodiments.

What is claimed is:

1. An apparatus for printing metadata that is not visible in a human visible spectrum, said apparatus comprising:
   an imaging unit operable to capture an image of a physical document, said physical document comprising content printed via a first ink that is visible in said human visible spectrum;
   a processor operable:
      to generate said metadata based on an attribute determined from said physical document;
      to generate an index corresponding to said metadata, said index associated with said image of said physical document; and
   a printer associated with said processor and operable:
      to print a tag encoding said metadata on a location of said physical document that overlaps at least a portion of said content, said tag printed using a second ink that is substantially invisible in said human visible spectrum, said tag readable when illuminated with light outside said human visible spectrum, and said tag comprising a start bar field and a tag field, said start field comprising:
         a plurality of start field bars, a bar width of each of said plurality of start field bars being equal; and
         a plurality of start field spaces, each start field space of the plurality of start field spaces being defined between adjacent start field bars of said plurality of start field bars, a space width of each of said start field spaces being equal, said space width of each of said start field spaces being an integer multiple of said bar width of said plurality of start field bars, such that said plurality of start field bars are spaced equally apart and said space width of each start field space between adjacent start field bars being proportional to said bar width, said tag field comprising:
            a plurality of tag field bars having a same bar width as said bar width of said plurality of start field bars; and
            said plurality of tag field bars being unequally spaced apart.

2. The apparatus as recited in claim 1 wherein said tag is a barcode and said start bar field provides a uniform signal in both time and luminance output.

3. The apparatus as recited in claim 2 wherein said tag field encodes a number in spaces separating said plurality of tag field bars in said tag field.

4. The apparatus as recited in claim 1 wherein said printer is an inkjet printer.

5. The apparatus as recited in claim 3 wherein said second ink includes an infrared fluorescent dye.

6. The apparatus as recited in claim 1 wherein said physical document comprises a check, a deposit slip, a coupon, a lottery ticket, currency, a medical insurance claim form, a medical insurance explanation of benefits statement, a credit application, an architectural drawing, a mechanical drawing, an envelope, a lunch voucher, an airline ticket, a sport event ticket, or an X-ray film.

7. An apparatus for scanning a physical document bearing content visible in a human visible spectrum, said apparatus comprising:
   a reader, including:
      a first light source defined at a first angle that is acute relative to said physical document and operable to project light upon said physical document;
      a second light source defined at a second angle that is acute relative to said physical document and operable to project light upon said physical document, said first angle opposite to said second angle; and
      a scanner operable to read a tag comprising metadata generated based on an attribute of said physical document, said tag printed on said physical document with a first ink substantially invisible in said human visible spectrum and overlapping at least a portion of said content printed on said physical document using a second ink that is visible in said human visible spectrum, said scanner comprising a photomultiplier tube that detects a fluorescent signal produced by said first ink to read said tag, said tag comprising a start bar field and a tag field,
         said start field comprising:
            a plurality of start field bars, a bar width of each of said first plurality of start field bars being equal; and
            a plurality of start field spaces, each start field space of the plurality of start field spaces being defined between adjacent start field bars of said plurality of start field bars, a space width of each of said start field spaces being equal, said space width of each of said start field spaces being an integer multiple of said bar width of said plurality of start field bars, such that said plurality of start field bars are spaced equally apart and said space width of each start field space between adjacent start field bars being proportional to said bar width, said tag field comprising:
               a plurality of tag field bars having a same bar width as said bar width of said plurality of start field bars; and
               said plurality of tag field bars being unequally spaced apart, and
            said photomultiplier tube defined between said first light source and said second light source at a perpendicular angle relative to said physical document; and a processor operable to compare said metadata with an index of an image of said physical document, said index generated based on said metadata, said reader sorting said physical document routing said physical document to a location when said first metadata matches said index.

8. The apparatus as recited in claim 7 wherein said first light source and said second light source excites said first ink to produce said fluorescent signal.

9. The apparatus as recited in claim 7 wherein first light source and said second light source comprise at least one red light-emitting diode.

10. The apparatus as recited in claim 7 wherein a portion of said fluorescent signal, produced by said start bar field, is uniform in luminance output.

11. The apparatus as recited in claim 10 wherein said tag field encodes a number in spaces separating the plurality of tag field bars in said tag field.

12. The apparatus as recited in claim 7 wherein said first ink includes an infrared fluorescent dye having a polyatomic ion of Iodide.

13. The apparatus as recited in claim 7 wherein said physical document comprises a check, a deposit slip, a coupon, a lottery ticket, currency, a medical insurance claim form, a medical insurance explanation of benefits statement, a credit application, an architectural drawing, a mechanical drawing, an envelope, a lunch voucher, an airline ticket, a sport event ticket, or an X-ray film.

14. An apparatus for processing a physical document bearing content visible in a human visible spectrum and metadata regarding said physical document printed in a first ink substantially invisible in said human visible spectrum, said apparatus comprising:
  a reader operable to read a tag comprising said metadata using light outside of said spectrum, said light output from both a first light source and a second light source, said first light source defined at a first angle that is acute relative to said physical document, said second light source defined at a second angle that is acute relative to said physical document, said first angle opposite to said second angle, said tag overlapping at least a portion of said content printed on said physical document using a second ink that is visible in said human visible spectrum, said tag comprising a start bar field and a tag field,
  said start field comprising:
    a plurality of start field bars, a bar width of each of said first plurality of start field bars being equal; and
    a plurality of start field spaces, each start field space of the plurality of start field spaces being defined between adjacent start field bars of said plurality of start field bars, a space width of each of said start field spaces being equal, said space width of each of said start field spaces being an integer multiple of said bar width of said plurality of start field bars, such that said plurality of start field bars are spaced equally apart and said space width of each start field space between adjacent start field bars being proportional to said bar width,
  said tag field comprising:
    a plurality of tag field bars having a same bar width as said bar width of said plurality of start field bars; and
    said second plurality of tag field bars being unequally spaced apart,
  said reader defined between said first light source and said second light source at
  a perpendicular angle relative to said physical document; and
  a processor coupled to said reader and configured to route said physical document to a location based on a comparison between said metadata and an index associate with an image of said physical document, said metadata generated based on an attribute of said physical document and said index generated based on said metadata.

15. The apparatus as recited in claim 14 wherein said reader includes a photomultiplier.

16. The apparatus as recited in claim 14 wherein said tag is embodied in a barcode.

17. The apparatus as recited in claim 16 wherein said tag field encodes a number in spaces separating the plurality of tag field bars in said tag field, a respective width of each space of said number of spaces being an integer multiple of a width of an adjacent tag field bar.

18. The apparatus as recited in claim 14 wherein said first ink includes an infrared fluorescent dye.

19. The apparatus as recited in claim 14 wherein said physical document is selected from a group consisting of: a check, a deposit slip, a coupon, a lottery ticket, currency, a medical insurance claim form, a medical insurance explanation of benefits statement, a credit application, an architectural drawing, a mechanical drawing, an envelope, a lunch voucher, an airline ticket, a sport event ticket, and an X-ray film.

20. A method of processing a physical document bearing content visible in a human visible spectrum and metadata regarding said physical document printed in a first ink substantially invisible in said human visible spectrum, comprising:
  illuminating said physical document with a light outside of said human visible spectrum, said light output from both a first light source and a second light source, said first light source defined at a first angle that is acute relative to said physical document, said second light source defined at a second angle that is acute relative to said physical document and said first angle opposite to said second angle;
  reading, via a tag reader defined between said first light source and said second light source at a perpendicular angle relative to said physical document, a tag in response to said illumination, said tag overlapping at least a portion of said content printed on said physical document using a second ink that is visible in said human visible spectrum, said tag encoding said metadata generated based on an attribute of said physical document, and said tag comprising a start bar field and a tag field,
  said start field comprising:
    a plurality of start field bars, a bar width of each of said plurality of start field bars being equal; and
    a plurality of start field spaces, each start field space of the plurality of start field spaces being defined between adjacent start field bars of said plurality of start field bars, a space width of each of said start field spaces being equal, said space width of each of said start field spaces being an integer multiple of said bar width of said plurality of start field bars, such that said plurality of start field bars are spaced equally apart and said space width of each start field space between adjacent start field bars being proportional to said bar width, said tag field comprising:
a plurality of tag field bars having a same bar width as said bar width of said plurality of start field bars; and
said plurality of tag field bars being unequally spaced apart; and routing said physical document to a location based on a comparison between said metadata and an index associated with an image file containing an image of said physical document, said index generated based on said metadata.

21. The method as recited in claim 20 wherein said reading is carried out with a photomultiplier.

22. The method as recited in claim 20 wherein said tag is embodied in a barcode.

23. The method as recited in claim 22 wherein said tag field encodes a number in spaces separating the plurality of tag field bars in said tag field a respective width of each space of said number of spaces being an integer multiple of a width of an adjacent tag field bar.

24. The method as recited in claim 20 wherein said first ink includes an infrared fluorescent dye.

25. The method as recited in claim 20 wherein said physical document comprises a check, a deposit slip, a coupon, a lottery ticket, currency, a medical insurance claim form, a medical insurance explanation of benefits statement, a credit application, an architectural drawing, a mechanical drawing, an envelope, a lunch voucher, an airline ticket, a sport event ticket, or an X-ray film.

26. The apparatus as recited in claim 1 wherein said content is printed on said physical document prior to said physical document being processed by said apparatus.

* * * * *